US010144825B2

(12) United States Patent
Topolkaraev et al.

(10) Patent No.: US 10,144,825 B2
(45) Date of Patent: *Dec. 4, 2018

(54) RIGID RENEWABLE POLYESTER COMPOSITIONS HAVING A HIGH IMPACT STRENGTH AND TENSILE ELONGATION

(71) Applicant: Kimberly-Clark Worldwide, Inc., Neenah, WI (US)

(72) Inventors: Vasily A. Topolkaraev, Appleton, WI (US); Neil T. Scholl, Appleton, WI (US); Ryan J. McEneany, Appleton, WI (US); Thomas A. Eby, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,267

(22) Filed: Feb. 10, 2015

(65) Prior Publication Data

US 2015/0152261 A1    Jun. 4, 2015

Related U.S. Application Data

(63) Continuation of application No. 13/370,869, filed on Feb. 10, 2012, now Pat. No. 8,975,305.

(51) Int. Cl.
| | | |
|---|---|---|
| *C08L 67/04* | (2006.01) | |
| *C08L 63/00* | (2006.01) | |
| *C08L 23/08* | (2006.01) | |
| *C08L 23/10* | (2006.01) | |
| *C08J 9/00* | (2006.01) | |
| *C08J 9/28* | (2006.01) | |

(52) U.S. Cl.
CPC ............. *C08L 67/04* (2013.01); *C08J 9/0061* (2013.01); *C08L 23/0807* (2013.01); *C08L 23/10* (2013.01); *C08L 63/00* (2013.01); *C08J 9/28* (2013.01); *C08J 2363/00* (2013.01); *C08J 2367/04* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 3,338,992 | A | 8/1967 | Kinney |
| 3,341,394 | A | 9/1967 | Kinney |
| 3,650,649 | A | 3/1972 | Schippers |
| 3,692,618 | A | 9/1972 | Dorschner et al. |
| 3,726,955 | A | 4/1973 | Hughes et al. |
| 3,849,241 | A | 11/1974 | Butin et al. |
| 3,855,046 | A | 12/1974 | Hansen et al. |
| 4,041,203 | A | 8/1977 | Brock et al. |
| 4,055,702 | A | 10/1977 | Guthrie et al. |
| 4,340,563 | A | 7/1982 | Appel et al. |
| 4,374,888 | A | 2/1983 | Bornslaeger |
| 4,405,688 | A | 9/1983 | Lowery et al. |
| 4,698,372 | A | 10/1987 | Moss |
| 4,707,398 | A | 11/1987 | Boggs |
| 4,708,800 | A | 11/1987 | Ichikawa et al. |
| 4,770,931 | A | 9/1988 | Pollock et al. |
| 4,789,592 | A | 12/1988 | Taniguchi et al. |
| 4,789,699 | A | 12/1988 | Kieffer et al. |
| 4,795,668 | A | 1/1989 | Krueger et al. |
| 4,797,468 | A | 1/1989 | De Vries |
| 4,822,678 | A | 4/1989 | Brody et al. |
| 4,902,553 | A | 2/1990 | Hwang et al. |
| 4,937,299 | A | 6/1990 | Ewen et al. |
| 4,983,450 | A | 1/1991 | Yanagihara |
| 5,057,368 | A | 10/1991 | Largman et al. |
| 5,069,970 | A | 12/1991 | Largman et al. |
| 5,084,334 | A | 1/1992 | Hamano et al. |
| 5,108,820 | A | 4/1992 | Kaneko et al. |
| 5,162,074 | A | 11/1992 | Hills |
| 5,169,712 | A | 12/1992 | Tapp |
| 5,179,164 | A | 1/1993 | Lausberg et al. |
| 5,213,881 | A | 5/1993 | Timmons et al. |

(Continued)

FOREIGN PATENT DOCUMENTS

| | | | |
|---|---|---|---|
| EP | 1054085 | A1 | 11/2000 |
| EP | 1579048 | B1 | 7/2001 |

(Continued)

OTHER PUBLICATIONS

Japanese Patent—JP2007161825, Jun. 28, 2007.
Abstract of Japanese Patent—JP2010280921 dated Dec. 16, 2010, 1 page.
Machine Translation of JPH09059498, Mar. 4, 1997.
Machine Translation of JP2005-088600, Apr. 7, 2005.
Machine Translation of JP2007-270076, Oct. 18, 2007.
Machine Translation of JP2009-197099, Sep. 3, 2009.
Machine Translation of JP2010-001369, Jan. 7, 2010.
Machine Translation of JP2010-046852, Mar. 4, 2010.
Abstract of Korean Patent—KR20080072740, Aug. 6, 2008, 1 page.
Abstract of Korean Patent—KR20090024709, Mar. 9, 2009, 1 page.

(Continued)

*Primary Examiner* — Kara B Boyle
(74) *Attorney, Agent, or Firm* — Dority & Manning, P.A.

(57) ABSTRACT

A thermoplastic composition that contains a rigid renewable polyester and a polymeric toughening additive is provided. The toughening additive can be dispersed as discrete physical domains within a continuous matrix of the renewable polyester. An increase in the deformation force and elongational strain causes debonding to occur in the renewable polyester matrix at those areas located adjacent to the discrete domains. This can result in the formation of a plurality of voids adjacent to the discrete domains that can help to dissipate energy under load and increase impact strength. To even further increase the ability of the composition to dissipate energy in this manner, an interphase modifier may be employed that reduces the degree of friction between the toughening additive and renewable polyester and thus enhances the degree and uniformity of debonding.

23 Claims, 4 Drawing Sheets

(56) References Cited

U.S. PATENT DOCUMENTS

| | | |
|---|---|---|
| 5,218,071 A | 6/1993 | Tsutsui et al. |
| 5,238,735 A | 8/1993 | Nagou et al. |
| 5,252,642 A | 10/1993 | Sinclair et al. |
| 5,266,610 A | 11/1993 | Malhotra et al. |
| 5,272,236 A | 12/1993 | Lai et al. |
| 5,277,976 A | 1/1994 | Hogle et al. |
| 5,278,272 A | 1/1994 | Lai et al. |
| 5,317,059 A | 5/1994 | Chundury et al. |
| 5,322,728 A | 6/1994 | Davey et al. |
| 5,328,760 A | 7/1994 | Gillberg-LaForce |
| 5,330,348 A | 7/1994 | Aneja et al. |
| 5,336,552 A | 8/1994 | Strack et al. |
| 5,350,624 A | 9/1994 | Georger et al. |
| 5,382,400 A | 1/1995 | Pike et al. |
| 5,422,377 A | 6/1995 | Aubert |
| 5,458,971 A | 10/1995 | Hernandez |
| 5,464,688 A | 11/1995 | Timmons et al. |
| 5,466,410 A | 11/1995 | Hills |
| 5,470,944 A | 11/1995 | Bonsignore |
| 5,472,775 A | 12/1995 | Obijeski et al. |
| 5,476,652 A | 12/1995 | Chinuki et al. |
| 5,486,166 A | 1/1996 | Bishop et al. |
| 5,490,846 A | 2/1996 | Ellis et al. |
| 5,502,158 A | 3/1996 | Sinclair et al. |
| 5,539,056 A | 7/1996 | Yang et al. |
| 5,547,756 A | 8/1996 | Kamo et al. |
| 5,571,619 A | 11/1996 | McAlpin et al. |
| 5,596,052 A | 1/1997 | Resconi et al. |
| 5,679,432 A | 10/1997 | Holmquest |
| 5,686,531 A | 11/1997 | Engelke et al. |
| 5,695,376 A | 12/1997 | Datta et al. |
| 5,695,868 A | 12/1997 | McCormack |
| 5,702,377 A | 12/1997 | Collier, IV et al. |
| 5,709,948 A | 1/1998 | Perez et al. |
| 5,714,573 A | 2/1998 | Randall et al. |
| 5,726,220 A | 3/1998 | Tokushige et al. |
| 5,766,760 A | 6/1998 | Tsai et al. |
| 5,770,682 A | 6/1998 | Ohara et al. |
| 5,800,758 A | 9/1998 | Topolkaraev et al. |
| 5,807,490 A | 9/1998 | Davis et al. |
| 5,821,327 A | 10/1998 | Oota et al. |
| 5,843,057 A | 12/1998 | McCormack |
| 5,844,067 A | 12/1998 | Erneta |
| 5,853,886 A | 12/1998 | Pinnavaia et al. |
| 5,855,999 A | 1/1999 | McCormack |
| 5,880,254 A | 3/1999 | Ohara et al. |
| 5,883,026 A | 3/1999 | Reader et al. |
| 5,883,199 A | 3/1999 | McCarthy et al. |
| 5,888,524 A | 3/1999 | Cole |
| 5,908,598 A | 6/1999 | Rousseau et al. |
| 5,931,823 A | 8/1999 | Stokes et al. |
| 5,932,497 A | 8/1999 | Morman et al. |
| 5,939,467 A | 8/1999 | Wnuk et al. |
| 5,968,643 A | 10/1999 | Topolkaraev et al. |
| 5,997,981 A | 12/1999 | McCormack et al. |
| 6,002,064 A | 12/1999 | Kobylivker et al. |
| 6,015,764 A | 1/2000 | McCormack et al. |
| 6,037,281 A | 3/2000 | Mathis et al. |
| 6,060,638 A | 5/2000 | Paul et al. |
| 6,071,451 A | 6/2000 | Wang et al. |
| 6,090,325 A | 7/2000 | Wheat et al. |
| 6,096,014 A | 8/2000 | Haffner et al. |
| 6,111,163 A | 8/2000 | McCormack et al. |
| 6,117,928 A | 9/2000 | Hiltunen et al. |
| 6,153,138 A | 11/2000 | Helms, Jr. et al. |
| 6,197,237 B1 | 3/2001 | Tsai et al. |
| 6,200,669 B1 | 3/2001 | Marmon et al. |
| 6,214,933 B1 | 4/2001 | Wang et al. |
| 6,228,923 B1 | 5/2001 | Lombardi et al. |
| 6,235,825 B1 | 5/2001 | Yoshida et al. |
| 6,268,048 B1 | 7/2001 | Topolkaraev et al. |
| 6,291,597 B1 | 9/2001 | Gruber et al. |
| 6,309,988 B1 | 10/2001 | Tsai et al. |
| 6,326,458 B1 | 12/2001 | Gruber et al. |
| 6,337,198 B1 | 1/2002 | Levene et al. |
| 6,348,258 B1 | 2/2002 | Topolkaraev et al. |
| 6,368,990 B1 | 4/2002 | Jennergren et al. |
| 6,372,846 B1 | 4/2002 | McGrail et al. |
| 6,461,457 B1 | 10/2002 | Taylor et al. |
| 6,479,003 B1 | 11/2002 | Furgiuele et al. |
| 6,494,390 B1 | 12/2002 | Khait et al. |
| 6,500,563 B1 | 12/2002 | Datta et al. |
| 6,509,092 B1 | 1/2003 | Dugan |
| 6,582,810 B2 | 6/2003 | Heffelfinger |
| 6,586,073 B2 | 7/2003 | Perez et al. |
| 6,642,429 B1 | 11/2003 | Carter et al. |
| 6,660,211 B2 | 12/2003 | Topolkaraev et al. |
| 6,663,611 B2 | 12/2003 | Blaney et al. |
| 6,713,175 B1 | 3/2004 | Terada et al. |
| 6,720,085 B2 | 4/2004 | Ito et al. |
| 6,756,331 B2 | 6/2004 | Kasemura et al. |
| 6,811,874 B2 | 11/2004 | Tanaka et al. |
| 6,812,272 B2 | 11/2004 | Fischer |
| 6,815,475 B2 | 11/2004 | Donald et al. |
| 6,818,173 B1 | 11/2004 | Khait |
| 6,824,680 B2 | 11/2004 | Chandavasu et al. |
| 6,824,734 B2 | 11/2004 | Boggs et al. |
| 6,838,403 B2 | 1/2005 | Tsai et al. |
| 6,869,985 B2 | 3/2005 | Mohanty et al. |
| 6,905,759 B2 | 6/2005 | Topolkaraev et al. |
| 6,914,018 B1 | 7/2005 | Uitenbroek et al. |
| 6,949,288 B2 | 9/2005 | Hodge et al. |
| 7,097,904 B2 | 8/2006 | Ochi et al. |
| 7,122,246 B2 | 10/2006 | Comb et al. |
| 7,135,523 B2 | 11/2006 | Ho et al. |
| 7,141,168 B2 | 11/2006 | Sakamoto et al. |
| 7,157,032 B2 | 1/2007 | Eloo |
| 7,223,359 B2 | 5/2007 | Torkelson et al. |
| 7,256,223 B2 | 8/2007 | Mohanty et al. |
| 7,273,894 B2 | 9/2007 | Shelby et al. |
| 7,354,973 B2 | 4/2008 | Flexman |
| 7,368,503 B2 | 5/2008 | Hale |
| 7,393,590 B2 | 7/2008 | Scheer et al. |
| 7,445,735 B2 | 11/2008 | Miller et al. |
| 7,514,503 B2 | 4/2009 | Nakamichi et al. |
| 7,566,753 B2 | 7/2009 | Randall et al. |
| 7,619,132 B2 | 11/2009 | Topolkaraev et al. |
| 7,632,544 B2 | 12/2009 | Ho et al. |
| 7,754,807 B2 | 7/2010 | Priedeman, Jr. et al. |
| 7,863,382 B2 | 1/2011 | Ishii et al. |
| 7,872,056 B2 | 1/2011 | Cheung et al. |
| 7,872,169 B2 | 1/2011 | Ruiz et al. |
| 7,910,041 B1 | 3/2011 | Priedeman, Jr. |
| 7,914,891 B2 | 3/2011 | Amundson et al. |
| 7,935,418 B2 | 5/2011 | Koops et al. |
| 7,943,218 B2 | 5/2011 | Knoerzer et al. |
| 7,977,397 B2 | 7/2011 | Cheung et al. |
| 7,984,591 B2 | 7/2011 | Cashin et al. |
| 7,989,062 B2 | 8/2011 | Chakravarty et al. |
| 7,994,078 B2 | 8/2011 | Reichmann et al. |
| 7,998,579 B2 | 8/2011 | Lin et al. |
| 8,022,139 B2 | 9/2011 | Kurihara et al. |
| 8,026,309 B2 | 9/2011 | Halahmi et al. |
| 8,030,382 B2 | 10/2011 | Endo et al. |
| 8,044,134 B2 | 10/2011 | Chung et al. |
| 8,075,994 B2 | 12/2011 | Sakamoto et al. |
| 8,076,406 B2 | 12/2011 | Brule et al. |
| 8,168,292 B2 | 5/2012 | Morin |
| 8,188,188 B2 | 5/2012 | Kobayashi et al. |
| 8,198,200 B2 | 6/2012 | Autran et al. |
| 8,236,893 B2 | 8/2012 | Nakagawa et al. |
| 8,268,738 B2 | 9/2012 | McEneany et al. |
| 8,268,913 B2 | 9/2012 | Li et al. |
| 8,287,677 B2 | 10/2012 | Lake et al. |
| 8,313,818 B2 | 11/2012 | Vo et al. |
| 8,323,837 B2 | 12/2012 | Nishida et al. |
| 8,334,327 B2 | 12/2012 | Kaufman et al. |
| 8,334,348 B2 | 12/2012 | Hogt et al. |
| 8,362,145 B2 | 1/2013 | Li et al. |
| 8,372,917 B2 | 2/2013 | Li et al. |
| 8,394,306 B2 | 3/2013 | Nishida et al. |
| 8,410,215 B2 | 4/2013 | Sano et al. |
| 8,415,008 B2 | 4/2013 | Ito et al. |
| 8,420,193 B2 | 4/2013 | Hiruma et al. |

(56) References Cited

U.S. PATENT DOCUMENTS

| | | |
|---|---|---|
| 8,444,905 B2 | 5/2013 | Li et al. |
| 8,466,337 B2 | 6/2013 | Wang et al. |
| 8,476,326 B2 | 7/2013 | VanSumeren et al. |
| 8,530,577 B2 | 9/2013 | Li et al. |
| 8,545,971 B2 | 10/2013 | Li et al. |
| 8,575,275 B2 | 11/2013 | Henschke et al. |
| 8,586,192 B2 | 11/2013 | Li et al. |
| 8,603,614 B2 | 12/2013 | Lam et al. |
| 8,628,718 B2 | 1/2014 | Li et al. |
| 8,637,130 B2 | 1/2014 | Wang et al. |
| 8,658,069 B2 | 2/2014 | Auffermann et al. |
| 8,684,739 B2 | 4/2014 | Steffier et al. |
| 8,695,811 B2 | 4/2014 | Kang et al. |
| 8,709,591 B2 | 4/2014 | Sumi et al. |
| 8,722,804 B2 | 5/2014 | Lue et al. |
| 8,759,446 B2 | 6/2014 | Li et al. |
| 8,829,099 B2 | 9/2014 | Kumazawa et al. |
| 8,936,740 B2 | 1/2015 | Topolkaraev et al. |
| 8,980,964 B2 | 3/2015 | Topolkaraev et al. |
| 9,040,598 B2 | 5/2015 | Scholl et al. |
| 9,127,915 B1 | 9/2015 | Tsai et al. |
| 9,194,065 B2 | 11/2015 | Moore et al. |
| 9,206,311 B2 | 12/2015 | Steinke et al. |
| 9,345,802 B2 | 5/2016 | Reichardt et al. |
| 9,512,311 B2 | 12/2016 | Fine et al. |
| 9,518,181 B2 | 12/2016 | Scholl et al. |
| 2003/0039775 A1 | 2/2003 | Kong |
| 2003/0105231 A1 | 6/2003 | Miller |
| 2003/0153684 A1 | 8/2003 | Miller |
| 2003/0162013 A1 | 8/2003 | Topolkaraev et al. |
| 2003/0180525 A1 | 9/2003 | Strack |
| 2004/0002273 A1 | 1/2004 | Fitting et al. |
| 2004/0038028 A1 | 2/2004 | Tanaka et al. |
| 2004/0077792 A1 | 4/2004 | Qiao et al. |
| 2004/0078015 A1 | 4/2004 | Copat et al. |
| 2004/0170852 A1 | 9/2004 | Gustafson |
| 2004/0248486 A1 | 12/2004 | Hodson |
| 2005/0054255 A1 | 3/2005 | Morman et al. |
| 2005/0059941 A1 | 3/2005 | Baldwin et al. |
| 2005/0112363 A1 | 5/2005 | Ning |
| 2005/0119359 A1* | 6/2005 | Shelby .............. B32B 27/08 521/50 |
| 2005/0221075 A1 | 10/2005 | Travelute, III et al. |
| 2005/0245162 A1 | 11/2005 | McCormack et al. |
| 2006/0094810 A1 | 5/2006 | Kim et al. |
| 2006/0257656 A1 | 11/2006 | Ochi et al. |
| 2006/0263394 A1 | 11/2006 | Oyama et al. |
| 2007/0182041 A1 | 8/2007 | Rizk et al. |
| 2007/0264897 A1 | 11/2007 | Collias et al. |
| 2008/0042312 A1 | 2/2008 | Chen et al. |
| 2008/0095978 A1 | 4/2008 | Siqueira et al. |
| 2008/0147165 A1 | 6/2008 | Hossainy et al. |
| 2008/0152894 A1 | 6/2008 | Belhoffer |
| 2008/0287024 A1 | 11/2008 | Chakravarty et al. |
| 2008/0287026 A1 | 11/2008 | Chakravarty et al. |
| 2008/0311814 A1 | 12/2008 | O'Sickey et al. |
| 2009/0060860 A1 | 3/2009 | Almenar et al. |
| 2009/0068463 A1 | 3/2009 | Mochizuki et al. |
| 2009/0069463 A1 | 3/2009 | Serizawa et al. |
| 2009/0124956 A1 | 5/2009 | Swetlin et al. |
| 2009/0239086 A1 | 9/2009 | Ishizuka et al. |
| 2009/0246155 A1 | 10/2009 | Bitler et al. |
| 2009/0274871 A1 | 11/2009 | Takahashi et al. |
| 2009/0311937 A1 | 12/2009 | He et al. |
| 2009/0318884 A1 | 12/2009 | Meyer et al. |
| 2009/0324911 A1 | 12/2009 | Li et al. |
| 2009/0326152 A1 | 12/2009 | Li et al. |
| 2010/0003882 A1 | 1/2010 | Sumi et al. |
| 2010/0028657 A1 | 2/2010 | Ito et al. |
| 2010/0048082 A1 | 2/2010 | Topolkaraev et al. |
| 2010/0056656 A1 | 3/2010 | Matsuoka et al. |
| 2010/0068484 A1 | 3/2010 | Kaufman |
| 2010/0092793 A1 | 4/2010 | Aithani et al. |
| 2010/0093888 A1 | 4/2010 | Endo et al. |
| 2010/0112357 A1 | 5/2010 | Fine et al. |
| 2010/0113677 A1 | 5/2010 | Brule et al. |
| 2010/0121295 A1 | 5/2010 | Collias et al. |
| 2010/0178477 A1 | 7/2010 | Jacobs |
| 2010/0305529 A1 | 12/2010 | Ashton et al. |
| 2011/0028062 A1 | 2/2011 | Chester et al. |
| 2011/0046281 A1 | 2/2011 | Scheer et al. |
| 2011/0065573 A1 | 3/2011 | McEneany et al. |
| 2011/0071238 A1 | 3/2011 | Bastioli et al. |
| 2011/0091714 A1 | 4/2011 | Chen et al. |
| 2011/0132519 A1 | 6/2011 | Li et al. |
| 2011/0136978 A1 | 6/2011 | Li et al. |
| 2011/0144273 A1 | 6/2011 | Li et al. |
| 2011/0178196 A1 | 7/2011 | Steinke et al. |
| 2011/0183563 A1 | 7/2011 | Ochi et al. |
| 2011/0190447 A1 | 8/2011 | Li et al. |
| 2011/0195210 A1 | 8/2011 | Li et al. |
| 2011/0245420 A1 | 10/2011 | Rasal et al. |
| 2011/0251346 A1 | 10/2011 | Li et al. |
| 2011/0262683 A1 | 10/2011 | Mochizuki et al. |
| 2011/0263776 A1 | 10/2011 | Debras et al. |
| 2012/0039975 A1 | 2/2012 | Lagaron Cabello et al. |
| 2012/0040185 A1 | 2/2012 | Topolkaraev et al. |
| 2012/0040582 A1 | 2/2012 | Topolkaraev et al. |
| 2012/0080822 A1 | 4/2012 | Li et al. |
| 2012/0164905 A1 | 6/2012 | Topolkaraev et al. |
| 2012/0202905 A1 | 8/2012 | Busch |
| 2012/0208037 A1 | 8/2012 | Li et al. |
| 2012/0211927 A1 | 8/2012 | Li et al. |
| 2012/0214944 A1 | 8/2012 | Li et al. |
| 2012/0225272 A1 | 9/2012 | Costeux et al. |
| 2012/0231242 A1 | 9/2012 | Boyer et al. |
| 2012/0238682 A1 | 9/2012 | Yang et al. |
| 2012/0296044 A1 | 11/2012 | Li et al. |
| 2012/0296045 A1 | 11/2012 | Li et al. |
| 2012/0315454 A1 | 12/2012 | Wang et al. |
| 2012/0321856 A1 | 12/2012 | Afshari |
| 2013/0118981 A1 | 5/2013 | Vogel et al. |
| 2013/0209770 A1 | 8/2013 | Topolkaraev |
| 2013/0210308 A1 | 8/2013 | McEneany et al. |
| 2013/0210621 A1 | 8/2013 | Topolkaraev et al. |
| 2013/0210949 A1 | 8/2013 | Scholl et al. |
| 2013/0213881 A1 | 8/2013 | Diallo et al. |
| 2014/0011015 A1 | 1/2014 | Gardner |
| 2014/0044954 A1 | 2/2014 | Matsubara |

FOREIGN PATENT DOCUMENTS

| | | |
|---|---|---|
| EP | 1361039 A1 | 11/2003 |
| EP | 1725614 B1 | 8/2008 |
| GB | 1385105 | 2/1975 |
| JP | H09-137049 A | 5/1997 |
| JP | 2008-156616 A | 7/2008 |
| JP | 2015-510555 A | 4/2015 |
| WO | WO 9853141 A1 | 11/1998 |
| WO | WO 01-14621 A1 | 3/2001 |
| WO | WO 0134886 A1 | 5/2001 |
| WO | WO 02/085969 A2 | 10/2002 |
| WO | WO 03049589 A1 | 6/2003 |
| WO | WO 03066704 A1 | 8/2003 |
| WO | WO 2007092417 A1 | 8/2007 |
| WO | WO 2007115081 A2 | 10/2007 |
| WO | WO 2007115081 A3 | 10/2007 |
| WO | WO 2008007919 | 1/2008 |
| WO | WO 2008020726 A1 | 2/2008 |
| WO | WO 2008030599 A2 | 3/2008 |
| WO | WO 2008030599 A3 | 3/2008 |
| WO | WO 2008079784 A2 | 7/2008 |
| WO | WO 2008079784 A3 | 7/2008 |
| WO | WO 2008130226 A2 | 10/2008 |
| WO | WO 2008130226 A3 | 10/2008 |
| WO | WO 2009/012284 A1 | 1/2009 |
| WO | WO 2009145778 A1 | 12/2009 |
| WO | WO 2009151437 A1 | 12/2009 |
| WO | WO 2009151439 A1 | 12/2009 |
| WO | WO 2010002669 A1 | 7/2010 |
| WO | 2011/084670 A1 | 7/2011 |
| WO | WO 2011080623 A2 | 7/2011 |

(56) References Cited

FOREIGN PATENT DOCUMENTS

| WO | WO 2011080623 A3 | 7/2011 |
| WO | WO 2012020336 A2 | 2/2012 |
| WO | WO 2012020336 A3 | 2/2012 |

OTHER PUBLICATIONS

Abstract of Korean Patent—KR20090034199, Apr. 7, 2009, 1 page.
Abstract of Article—Balakrishnan et al., "Mechanical, Thermal, and Morphological Properties of Polylactic Acid/Linear Low Density Polyethylene Blends," *Journal of Elastomers and Plastics*,vol. 42, No. 3, May 2010, pp. 223-239.
Article—Balakrishnan et al., "Novel toughened polylactic acid nanocomposite: Mechanical, thermal and morphological properties," *Materials and Design*, vol. 31, 2010, pp. 3289-3298.
Article—Chalamet et al., "Carboxyl Terminated Polyamide 12 Chain Extensions by Reactive Extrusion Using a Dioxazoline Coupling Agent. Part I: ExtrusionParameters Analysis," *Polymer Engineering and Science*, vol. 40, No. 1, Jan. 2000, pp. 263-274.
Article—Chalamet et al., "Carboxyl Terminated Polyamide 12 Chain Extension by Reactive Extrusion Using a Dioxazoline Coupling Agent. Part II: Effects of Extrusion Conditions," *Polymer Engineering and Science*, vol. 40, No. 12, Dec. 2002, pp. 2317-2327.
Article—Gramlich et al., "Reactive Compatibilization of Poly(L-lactide) and Conjugated Soybean Oil," *Macromolecules*, vol. 43, No. 5, 2010, pp. 2313-2321.
Article—Japon et al., "Reactive processing of poly(ethylene terephthalate) modified with multifunctional epoxy-based additives," *Polymer*, vol. 41, 2000, pp. 5809-5818.
Article—Jing et al., "A Bifunctional Monomer Derived from Lactide for Toughening Polylactide," *J. Am. Chem. Soc.*, vol. 130, No. 42, 2008, pp. 13826-13867.
Article—Hideko T. Oyama, "Super-tough poly(lactic acid) materials: Reactive blending with ethylene copolymer," *Polymer*, vol. 50, 2009, pp. 747-751
Article—Robertson et al., "Toughening of Polylactide with Polymerized Soybean Oil," *Macromolecules*, vol. 43, 2010, pp. 1807-1814.
Article—Sun et al., "Toughening of poly(butylene terephthalate) with epoxy-functionalized acrylonitrile-butadiene-styrene," *Polymer*, vol. 43, 2005, pp. 7632-7643
Article—Xanthos et al., "Reactive Modification of Polyethylene Terephthalate With Polyepoxides," *Polymer Engineering and Science*, vol. 41, No. 4, Apr. 2001, pp. 643-655.
Article—Zhang et al., "Preparation and properties of biodegradable poly(lactic acid)/poly(butylene adipate-co-terephthalate) blend with glycidyl methyacrylate as reactive processing agent," *J. Mater. Sci.*, vol. 44, 2009, pp. 250-256.
Part of Book—Biopolymers, vol. 4, Polyester III, Applications and Commercial Products, Edited by Y. Doi and A. Steinbüchel—Polylactides by Prof. Dr. Hideto Tsuji, 2002, pp. 129-177.
Part of Book—Handbook of Plasticizers, $2^{nd}$ Edition, 2004, 2012—Theories of Compatability by Yu et al.
Part of Book—Handbook of Polymers—Data for Polyethylene Terephthalate (PET), by George Wypych, 2012, pp. 436-440, 479-485, and 385-390.
Part of Book—Handbook of Polymers—Poly(lactic acid) (PLA) and Polyporphylene, by George Wypych, 2012, pp. 436-440, 479-485.
Technology Focus Report: Blends of PLA with Other Thermoplastics from NatureWorks®, Feb. 7, 2007, 5 pages.
Technology Focus Report: Toughened PLA from NatureWorks®, Mar. 1, 2007, 5 pages.
Product Information—PLA Processing Guide for Spinning Fibers from NatureWorks®, Mar. 15, 2005, 14 pages.
Product Information—NatureWorks® PLA Polymer 6201D—Fiber Melt Spinning from NatureWorks®, 2005, 3 pages.
Product Information on Lotader® AX8950, 2004, 2 pages.
Product Information—Lotader® Applications—Impact modifier for Engineer plastics, Jan. 3, 2012, 1 page.
Search Report and Written Opinion for PCT/IB2013/050730 dated Jun. 26, 2013, 15 pages.
Abstract of JP 2008144039, Jun. 26, 2008, 2 pages.
F.C. Campbell, "Chaper 1—Introduction to Composite Materials"ASM International, 2010, 29 pages.
Henton, et al., "Polyactic Acid Technology", Natural Fibers, Biopolymers, and Biocomposites, Feb. 11, 2005, 52 pages.
Machine Translation of JP 2007-002211A dated Jan. 11, 2007, 12 pages.
Machine Translation of JP 2007-270076A dated Oct. 18, 2007, 7 pages.
Machine Translation of JPH09-2911203A dated Nov. 11, 1997, 3 pages.

\* cited by examiner

RIGID RENEWABLE POLYESTER COMPOSITIONS HAVING A HIGH IMPACT STRENGTH AND TENSILE ELONGATION

RELATED APPLICATIONS

The present application is a continuation of U.S. application Ser. No. 13/370,869 having a filing date of Feb. 10, 2012, the entire contents of which is incorporated herein by reference.

BACKGROUND OF THE INVENTION

Injection molding is commonly used to form plastic articles that are relatively rigid in nature, including containers, medical devices, and so forth. For example, containers for stacks or rolls of pre-moistened wipes are generally formed by injection molding techniques. One problem associated with such containers, however, is that the molding material is often formed from a synthetic polymer (e.g., polypropylene or HDPE) that is not renewable. The use of renewable polymers in an injection molded article is problematic due to the difficulty involved with thermally processing such polymers. Renewable polyesters, for example, have a relatively high glass transition temperature and typically demonstrate a very high stiffness and tensile modulus, while having relatively low impact resistance and low ductility/elongations at break. As an example, polylactic acid has a glass transition temperature of about 59° C. and a tensile modulus of about 2 GPa or more. Nevertheless, the tensile elongation (at break) for PLA materials are only about 5%, and the notched impact strength is only about 0.22 J/cm. Such low impact strength and tensile elongation values significantly limit the use of such polymers in injection molded parts, where a good balance between material stiffness and impact strength is required.

As such, a need currently exists for a renewable polyester composition that is capable of exhibiting a relatively high impact strength and tensile elongation so that it can be readily employed in injection molded articles.

SUMMARY OF THE INVENTION

In accordance with one embodiment of the present invention, a melt blended, thermoplastic composition is disclosed that comprises at least one rigid renewable polyester having a glass transition temperature of about 0° C. or more, from about 1 wt. % to about 30 wt. % of at least one polymeric toughening additive based on the weight of the renewable polyester, and from about 0.1 wt. % to about 20 wt. % of at least one interphase modifier based on the weight of the renewable polyester. The thermoplastic composition has a morphology in which a plurality of discrete primary domains are dispersed within a continuous phase, the domains containing the polymeric toughening additive and the continuous phase containing the renewable polyester. Further, the composition exhibits an Izod impact strength of about 0.3 Joules per centimeter or more, measured at 23° C. according to ASTM D256-10 (Method A), and a tensile elongation at break of about 10% or more, measured at 23° C. according to ASTM D638-10. Further, the ratio of the glass transition temperature of the thermoplastic composition to the glass transition temperature of the renewable polyester is from about 0.7 to about 1.3.

In accordance with another embodiment of the present invention, a shaped article is disclosed that is formed from a thermoplastic composition. The thermoplastic composition comprises about 70 wt. % or more of at least one polylactic acid having a glass transition temperature of about 0° C. or more, from about 0.1 wt. % to about 30 wt. % of at least one polymeric toughening additive, and from about 0.1 wt. % to about 20 wt. % of at least one interphase modifier. The molded article exhibits an Izod impact strength of about 0.3 Joules per centimeter or more, measured at 23° C. according to ASTM D256-10 (Method A), and a tensile elongation at break of about 10% or more, measured at 23° C. according to ASTM D638-10.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
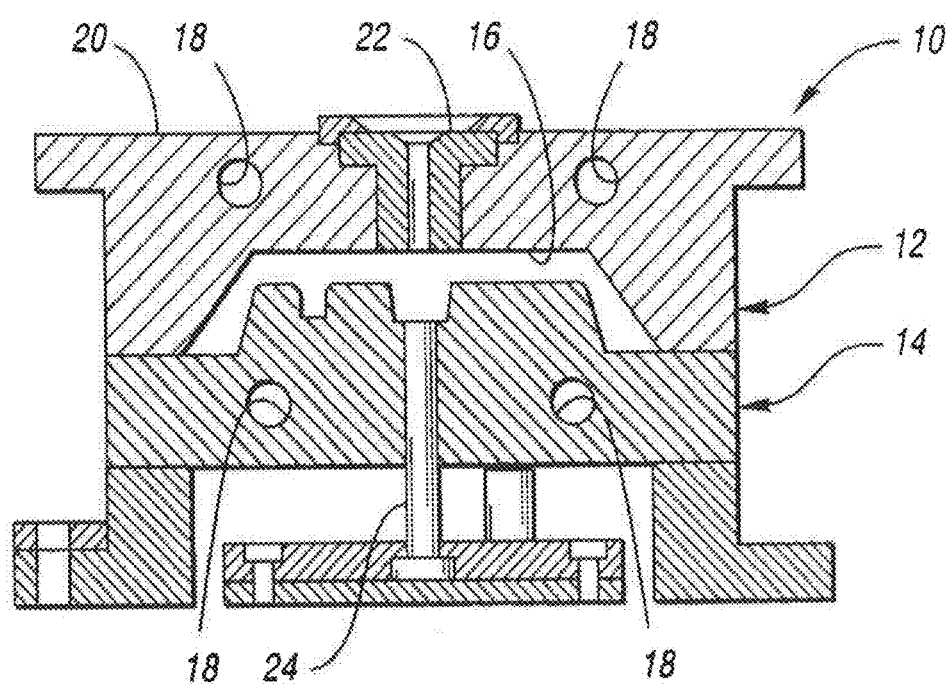
FIG. 1 is a schematic illustration of one embodiment of an injection molding apparatus for use in the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a thermoplastic composition that contains a rigid renewable polyester and a polymeric toughening additive. The present inventors have discovered that the specific nature of the components may be carefully controlled to achieve a composition having desirable morphological features. More particularly, the toughening additive can be dispersed as discrete physical domains within a continuous matrix of the renewable polyester. During the initial application of an external force at low elongational strain, the composition can behave as a monolithic material that exhibits high rigidity and tensile modulus. However, an increase in the deformation force and elongational strain causes debonding to occur in the renewable polyester matrix at those areas located adjacent to the discrete domains. This can result in the formation of a plurality of voids adjacent to the discrete domains that can help to dissipate energy under load and increase impact strength. To even further increase the ability of the composition to dissipate energy in this manner, the present inventors have discovered that an interphase modifier may be employed in the composition that reduces the degree of friction and connectivity between the toughening additive and renewable polyester and thus enhances the degree and uniformity of debonding. In this manner, the resulting voids can be distributed in a substantially homogeneous fashion throughout the composition. For example, the voids may be distributed in columns that are oriented in a direction generally perpendicular to the direction in which a stress is applied. Without intending to be limited by theory, it is believed that the presence of such a homogeneously distributed void system can result in in significant energy dissipation under load and a significantly enhanced impact strength.

The resulting thermoplastic composition, as well as shaped articles made therefrom, generally has a high degree of impact strength due to the unique morphology obtained by the present invention. The composition may, for instance, possess an Izod notched impact strength of about 0.3 Joules per centimeter ("J/cm") or more, in some embodiments about 0.5 J/cm or more, and in some embodiments, from about 0.8 J/cm to about 2.5 J/cm, measured at 23° C. according ASTM D256-10 (Method A). The tensile elongation at break may also be relatively high, such as about 10% or more, in some embodiments about 50% or more, and in some embodiments, from about 100% to about 300%. While achieving a very high degree of impact strength and tensile elongation, the present inventors have discovered that other mechanical properties are not adversely affected. For example, the composition may exhibit a peak stress of from about 10 to about 65 Megapascals ("MPa"), in some embodiments from about 15 to about 55 MPa, and in some embodiments, from about 25 to about 50 MPa; a break stress of from about 10 to about 65 MPa, in some embodiments from about 15 to about 60 MPa, and in some embodiments, from about 20 to about 55 MPa; and/or a tensile modulus of from about 500 to about 3800 MPa, in some embodiments from about 800 MPa to about 3400 MPa, and in some embodiments, from about 1000 MPa to about 3000 MPa. The tensile properties may be determined in accordance with ASTM D638-10 at 23° C.

Various embodiments of the present invention will now be described in more detail.

I. Thermoplastic Composition

A. Renewable Polyester

Renewable polyesters typically constitute from about 70 wt. % to about 99 wt. %, in some embodiments from about 75 wt. % to about 98 wt. %, and in some embodiments, from about 80 wt. % to about 95 wt. % of the thermoplastic composition. Any of a variety of renewable polyesters may generally be employed in the thermoplastic composition, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

Typically, the thermoplastic composition contains at least one renewable polyester that is rigid in nature and thus has a relatively high glass transition temperature. For example, the glass transition temperature ("$T_g$") may be about 0° C. or more, in some embodiments from about 5° C. to about 100° C., in some embodiments from about 30° C. to about 80° C., and in some embodiments, from about 50° C. to about 75° C. The renewable polyester may also have a melting temperature of from about 140° C. to about 260° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

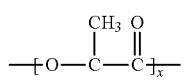

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470, 944; 5,770,682; 5,821,327; 5,880,254; and 6,326,458, which are incorporated herein in their entirety by reference thereto for all purposes.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 $\sec^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the renewable polyester have a moisture content of about 300 parts per million ("ppm") or less, in some embodiments about 200 ppm or less, in some embodiments from about 1 to about 100 ppm prior to blending with the toughening additive. Drying of the polyester may occur, for instance, at a temperature of from about 50° C. to about 100° C., and in some embodiments, from about 70° C. to about 80° C.

B. Polymeric Toughening Additive

As indicated above, the thermoplastic composition of the present invention also contains a polymeric toughening additive. Due to its polymeric nature, the toughening additive possesses a relatively high molecular weight that can help improve the melt strength and stability of the thermoplastic composition. Although not required, the polymeric toughening additive may be generally immiscible with the renewable polyester. In this manner, the toughening additive can better become dispersed as discrete phase domains within a continuous phase of the renewable polyester. The discrete domains are capable of absorbing energy that arises from an external force, which increases the overall toughness and strength of the resulting material. The domains may have a variety of different shapes, such as elliptical, spherical, cylindrical, etc. In one embodiment, for example, the domains have a substantially elliptical shape. The physical dimension of an individual domain is typically small enough to minimize the propagation of cracks through the polymer material upon the application of an external stress, but large enough to initiate microscopic plastic deformation and allow for shear zones at and around particle inclusions.

While the polymers may be immiscible, the toughening additive may nevertheless be selected to have a solubility parameter that is relatively similar to that of the renewable polyester. This can improve the interfacial compatibility and physical interaction of the boundaries of the discrete and continuous phases, and thus reduces the likelihood that the composition will fracture. In this regard, the ratio of the solubility parameter for the renewable polyester to that of the toughening additive is typically from about 0.5 to about 1.5, and in some embodiments, from about 0.8 to about 1.2. For example, the polymeric toughening additive may have a solubility parameter of from about 15 to about 30 $\text{MJoules}^{1/2}/\text{m}^{3/2}$, and in some embodiments, from about 18 to about 22 $\text{MJoules}^{1/2}/\text{m}^{3/2}$, while polylactic acid may have a solubility parameter of about 20.5 $\text{MJoules}^{1/2}/\text{m}^{3/2}$. The term "solubility parameter" as used herein refers to the "Hildebrand Solubility Parameter", which is the square root of the cohesive energy density and calculated according to the following equation:

$$\delta = \sqrt{(\Delta H_v - RT)/V_m}$$

where:
Δ Hv=heat of vaporization
R=Ideal Gas constant
T=Temperature
Vm=Molecular Volume The Hildebrand solubility parameters for many polymers are also available from the Solubility Handbook of Plastics, by Wyeych (2004), which is incorporated herein by reference.

The polymeric toughening additive may also have a certain melt flow rate (or viscosity) to ensure that the discrete domains and resulting voids can be adequately maintained. For example, if the melt flow rate of the toughening additive is too high, it tends to flow and disperse uncontrollably through the continuous phase. This results in lamellar or plate-like domains that are difficult to maintain and also likely to prematurely fracture. Conversely, if the melt flow rate of the toughening additive is too low, it tends to clump together and form very large elliptical domains, which are difficult to disperse during blending. This may cause uneven distribution of the toughening additive through the entirety of the continuous phase. In this regard, the present inventors have discovered that the ratio of the melt flow rate of the toughening additive to the melt flow rate of the renewable polyester is typically from about 0.2 to about 8, in some embodiments from about 0.5 to about 6, and in some embodiments, from about 1 to about 5. The polymeric toughening additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the polymeric toughening additive may also be selected to achieve the desired increase in toughness. For example, when a blend of the renewable polyester and toughening additive is applied with an external force, shear and/or plastic yielding zones may be initiated at and around the discrete phase domains as a result of stress concentrations that arise from a difference in the elastic modulus of the toughening additive and renewable polyester. Larger stress concentrations promote more intensive localized plastic flow at the domains, which allows them to become significantly elongated when stresses are imparted. These elongated domains allow the composition to exhibit a more pliable and softer behavior than the otherwise rigid polyester resin. To enhance the stress concentrations, the toughening additive is selected to have a relatively low Young's modulus of elasticity in comparison to the renewable polyester. For example, the ratio of the modulus of elasticity of the renewable polyester to that of the toughening additive is typically from about 1 to about 250, in some embodiments from about 2 to about 100, and in some embodiments, from about 2 to about 50. The modulus of elasticity of the toughening additive may, for instance, range from about 2 to about 500 Megapascals (MPa), in some embodiments from about 5 to about 300 MPa, and in some embodiments, from about 10 to about 200 MPa. To the contrary, the modulus of elasticity of polylactic acid is typically from about 800 MPa to about 2000 MPa.

To impart the desired increase in toughness, the polymeric toughening additive may also exhibit an elongation at break (i.e., the percent elongation of the polymer at its yield point) greater than the renewable polyester. For example, the polymeric toughening additive of the present invention may exhibit an elongation at break of about 50% or more, in some embodiments about 100% or more, in some embodiments from about 100% to about 2000%, and in some embodiments, from about 250% to about 1500%.

While a wide variety of polymeric additives may be employed that have the properties identified above, particularly suitable examples of such polymers may include, for instance, polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. Nos. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the polymeric toughening additive in the thermoplastic composition is selected to achieve the desired properties without significantly impacting the renewability of the resulting composition. For example, the toughening additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the renewable polyesters employed in the composition. The concentration of the toughening additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Interphase Modifier

An interphase modifier is also employed in the thermoplastic composition to alter the interaction between the toughening additive and the renewable polyester matrix. The modifier is generally in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the polymer toughening additive, resulting in a change in the interfacial tension between the renewable polyester and the toughening additive. By reducing physical forces at the interfaces between the polyester and the toughening additive, it is believed that the low viscosity, hydrophobic nature of the modifier can help facilitate debonding from the polyester matrix upon the application of an external force. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, etc. One particularly suitable interphase modifier is polyether polyol, such as commercially available under the trade name PLURIOL® WI from BASF Corp. Another suitable modifier is a partially renewable ester, such as commercially available under the trade name HALLGREEN® IM from Hallstar.

Although the actual amount may vary, the interphase modifier is typically employed in an amount of from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the renewable polyesters employed in the composition. The concentration of the interphase modifier in the entire thermoplastic composition may likewise constitute from about 0.05 wt. % to about 20 wt. %, in some embodiments from about 0.1 wt. % to about 15 wt. %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial renewable polyester. In this regard, the ratio of the glass temperature of the composition to that of the polyester is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the renewable polyester. For example, the melt flow rate of the composition (on a dry basis) may be from about 0.1 to about 70 grams per 10 minutes, in some embodiments from about 0.5 to about 50 grams per 10 minutes, and in some embodiments, from about 5 to about 25 grams per 10 minutes, determined at a load of 2160 grams and at a temperature of 190° C.

D. Compatibilizer

As indicated above, the polymeric toughening additive is generally selected so that it has a solubility parameter relatively close to that of the renewable polyester. Among other things, this can enhance the compatibility of the phases and improve the overall distribution of the discrete domains within the continuous phase. Nevertheless, in certain embodiments, a compatibilizer may optionally be employed to further enhance the compatibility between the renewable polyester and the polymeric toughening additive. This may be particularly desirable when the polymeric toughening additive possesses a polar moiety, such as polyurethanes, acrylic resins, etc. When employed, the compatibilizers typically constitute from about 0.5 wt. % to about 20 wt. %, in some embodiments from about 1 wt. % to about 15 wt. %, and in some embodiments, from about 1.5 wt. % to about 10 wt. % of the thermoplastic composition. One example of a suitable compatibilizer is a functionalized polyolefin. The polar component may, for example, be provided by one or more functional groups and the non-polar component may be provided by an olefin. The olefin component of the compatibilizer may generally be formed from any linear or branched α-olefin monomer, oligomer, or polymer (including copolymers) derived from an olefin monomer, such as described above.

The functional group of the compatibilizer may be any group that provides a polar segment to the molecule. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the compatibilizer may also be reactive. One example of such a reactive compatibilizer is a polyepoxide modifier that contains, on average, at least two oxirane rings per molecule. Without intending to be limited by theory, it is believed that such polyepoxide molecules can induce a reaction of the renewable polyester under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of the renewable polyester (esterification) or via a hydroxyl group (etherification). Oxazoline side reactions may likewise occur to form esteramide moieties. Through such reactions, the molecular weight of the renewable polyester may be increased to counteract the degradation often observed during melt processing. While it is desirable to induce a reaction with the renewable polyester as described above, the present inventors have discovered that too much of a reaction can lead to crosslinking between polyester backbones. If such crosslinking is allowed to proceed to a significant extent, the resulting polymer blend can become brittle and difficult to shape into a material with the desired strength and elongation properties.

In this regard, the present inventors have discovered that polyepoxide modifiers having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide modifier of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide modifier may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it can not only result in chain extension of the renewable polyester, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide modifier includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide modifier is a terpolymer formed from an epoxy-functional (meth)acrylic monomeric component, α-olefin monomeric component, and non-epoxy functional (meth)acrylic monomeric component. For example, the polyepoxide modifier may be poly(ethylene-co-methylacrylate-co-glycidyl methacrylate), which has the following structure:

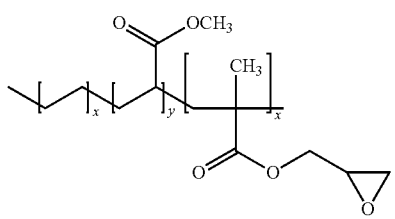

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164, which is incorporated herein in its entirety by reference thereto for all purposes. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the renewable polyester, but too high of a content may reduce the melt flow rate to such an extent that the polyepoxide modifier adversely impacts the melt strength of the polymer blend. Thus, in most embodiments, the epoxy-functional (meth) acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth) acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide modifier that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %.

In addition to controlling the type and relative content of the monomers used to form the polyepoxide modifier, the overall weight percentage may also be controlled to achieve the desired benefits. For example, if the modification level is too low, the desired increase in melt strength and mechanical properties may not be achieved. The present inventors have also discovered, however, that if the modification level is too high, molding may be restricted due to strong molecular interactions (e.g., crosslinking) and physical network formation by the epoxy functional groups. Thus, the polyepoxide modifier is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the renewable polyesters employed in the composition. The polyepoxide modifier may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

When employed, the polyepoxide modifier may also influence the morphology of the thermoplastic composition in a way that further enhances its reactivity with the renewable polyester. More particularly, the resulting morphology may have a plurality of discrete domains of the polyepoxide modifier distributed throughout a continuous polyester matrix. These "secondary" domains may have a variety of different shapes, such as elliptical, spherical, cylindrical, etc. Regardless of the shape, however, the size of an individual secondary domain, after blending, is small to provide an increased surface area for reaction with the renewable polyester. For example, the size of a secondary domain (e.g., length) typically ranges from about 10 to about 1000 nanometers, in some embodiments from about 20 to about 800 nanometers, in some embodiments from about 40 to about 600 nanometers, and in some embodiments from about 50 to about 400 nanometers. As noted above, the toughening additive also forms discrete domains within the polyester matrix, which are considered in the "primary" domains of the composition. Of course, it should be also understood that domains may be formed by a combination of the polyepoxide, toughening additive, and/or other components of the blend.

In addition to polyepoxides, other reactive compatibilizers may also be employed in the present invention, such as oxazoline-functionalized polymers, cyanide-functionalized polymers, etc. When employed, such reactive compatibilizers may be employed within the concentrations noted above for the polyepoxide modifier. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

E. Other Components

One beneficial aspect of the present invention is that good mechanical properties (e.g., elongation) may be provided without the need for conventional plasticizers, such as solid or semi-solid polyethylene glycol, such as available from Dow Chemical under the name Carbowax™). The thermoplastic composition may be substantially free of such plasticizers. Nevertheless, it should be understood that plasticizers may be used in certain embodiments of the present invention. When utilized, however, the plasticizers are typically present in an amount of less than about 10 wt. %, in some embodiments from about 0.1 wt. % to about 5 wt. %, and in some embodiments, from about 0.2 wt. % to about 2 wt. % of the thermoplastic composition. Of course, other ingredients may be utilized for a variety of different reasons.

For instance, materials that may be used include, without limitation, catalysts, pigments, antioxidants, stabilizers, surfactants, waxes, solid solvents, fillers, nucleating agents (e.g., titanium dioxide, calcium carbonate, etc.), particulates, and other materials added to enhance the processability of the thermoplastic composition. When utilized, it is normally desired that the amounts of these additional ingredients are minimized to ensure optimum compatibility and cost-effectiveness. Thus, for example, it is normally desired that such ingredients constitute less than about 10 wt. %, in some embodiments less than about 8 wt. %, and in some embodiments, less than about 5 wt. % of the thermoplastic composition.

II. Blending

The raw materials (e.g., renewable polyester, toughening additive, and interphase modifier) may be blended using any of a variety of known techniques. In one embodiment, for example, the raw materials may be supplied separately or in combination. For instance, the raw materials may first be dry mixed together to form an essentially homogeneous dry mixture. The raw materials may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, New Jersey or a Thermo Prism™ USALAB 16 extruder available from Thermo Electron Corp., Stone, England). Such extruders may include feeding and venting ports and provide high intensity distributive and dispersive mixing. For example, the raw materials may be fed to the same or different feeding ports of the twin-screw extruder and melt blended to form a substantially homogeneous melted mixture. If desired, other additives may also be injected into the polymer melt and/or separately fed into the extruder at a different point along its length. Alternatively, the additives may be pre-blended with the renewable polyester, toughening additive, and/or interphase modifier.

Regardless of the particular processing technique chosen, the raw materials are blended under sufficient shear/pressure and heat to ensure sufficient dispersion, but not so high as to adversely reduce the size of the discrete domains so that they are incapable of achieving the desired toughness and elongation. For example, blending typically occurs at a temperature of from about 180° C. to about 260° C., in some embodiments from about 185° C. to about 250° C., and in some embodiments, from about 190° C. to about 240° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 500 revolutions per minute ("rpm"), in some embodiments from about 70 to about 300 rpm, and in some embodiments, from about 100 to about 200 rpm. This may result in a temperature that is sufficient high to disperse the toughening additive and interphase modifier without adversely impacting the size of the resulting domains. The melt shear rate, and in turn the degree to which the polymers are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

III. Shaped Articles

Due to its unique and beneficial properties, the thermoplastic composition of the present invention is well suited for use in shaped articles, and particularly those having a relatively small thickness. For example, the article may have a thickness of about 100 micrometers to about 50 millimeters, in some embodiments from about 200 micrometers to about 10 millimeters, in some embodiments from about 400 micrometers to about 5 millimeters, and in some embodiments, from about 500 micrometers to about 2 millimeters.

The shaped article may be formed using any of a variety of techniques known in the art, such as profile extrusion, extrusion blow molding, injection molding, rotational molding, compression molding, etc., as well as combinations of the foregoing. Regardless of the process selected, the thermoplastic composition of the present invention may be used alone to form the article, or in combination with other polymeric components to form a shaped articles. For example, the thermoplastic composition can be profile extruded as a core while other polymer(s) can be extruded as a "skin" or external layer. In another embodiment, other polymer(s) may be injected or transferred into a mold during an injection molding process to form a skin layer around a core. Examples of machines suitable for co-injection, sandwich or two-component molding include machines produced by Presma Corp., Northeast Mold & Plastics, Inc. Although not required, the core of the shaped article is typically formed from the thermoplastic composition of the present invention and the skin layer is typically formed from a different polymer (e.g., polyolefins, polyesters, polyamides, etc.) that enhances surface and bulk and bonding properties for intended use.

Referring to FIG. 1, for example, one particular embodiment of a single-component injection molding apparatus or tool 10 that may be employed in the present invention is shown in more detail. In this embodiment, the apparatus 10 includes a first mold base 12 and a second mold base 14, which together define an article or component-defining mold cavity 16. Each of the mold bases 12 and 14 includes one or more cooling lines 18 through which a cooling liquid such as water flows to cool the apparatus 10 during use. The molding apparatus 10 also includes a resin flow path that extends from an outer exterior surface 20 of the first mold half 12 through a sprue 22 to the article-defining mold cavity 16. The resin flow path may also include a runner and a gate, both of which are not shown for purposes of simplicity. The molding apparatus 10 also includes one or more ejector pins 24 slidably secured within the second mold half 14 that helps to define the article-defining cavity 16 in the closed position of the apparatus 10, as indicated in FIG. 1. The ejector pin 24 operates in a well known fashion to remove a molded article or component from the article-defining cavity 16 in the open position of the molding apparatus 10.

The thermoplastic composition may be directly injected into the molding apparatus 10 using techniques known in the art. For example, the molding material may be supplied in the form of pellets to a feed hopper attached to a barrel that contains a rotating screw (not shown). As the screw rotates, the pellets are moved forward and undergo extreme pressure and friction, which generates heat to melt the pellets. Electric heater bands (not shown) attached to the outside of the barrel may also assist in the heating and temperature control during the melting process. For example, the bands may be heated to a temperature of from about 200° C. to about 260° C., in some embodiments from about 230° C. to about 255° C., and in some embodiments, from about 240° C. to about 250° C. Upon entering the molding cavity 16, the molding material is solidified by the cooling liquid flowing through the lines 18. The cooling liquid may, for example, be at a temperature (the "molding temperature") of from about 5° C. to about 50° C., in some embodiments from about 10° C. to about 40° C., and in some embodiments, from about 15° C. to about 30° C.

The shaped articles may have a variety of different sizes and configurations. For instance, the article may be used to form dispensers (e.g., for paper towels), packaging materials (e.g., food packaging, medical packaging, etc.), medical devices, such as surgical instruments (e.g., scalpels, scissors, retractors, suction tubes, probes, etc.); implants (e.g., bone plates, prosthetics, plates, screws, etc.); containers or bottles; and so forth. The article may also be used to form various parts used in "personal care" applications. For instance, in one particular embodiment, the article is used to form a wet wipe container. The configuration of the container may vary as is known in the art, such as described in U.S. Pat. No. 5,687,875 to Watts, et al.; U.S. Pat. No. 6,568,625 to Faulks, et al.; U.S. Pat. No. 6,158,614 to Haines, et al.; U.S. Pat. No. 3,973,695 to Ames; U.S. Pat. No. 6,523,690 to Buck, et al.; and U.S. Pat. No. 6,766,919 to Huang, et al., which are incorporated herein in their entirety by reference thereto for all purposes. Wipes for use with the container, e.g., wet wipes, may be arranged in any manner that provides convenient and reliable dispensing and that assists the wet wipes in not becoming overly dry. For example, the wet wipes may be arranged in the container as a plurality of individual wipes in a stacked configuration to provide a stack of wet wipes that may or may not be individually folded. The wet wipes can be individual wet wipes which are folded in a c-fold configuration, z-fold configuration, connected to adjacent wipes by a weakened line or other non-interfolded configurations as are known to those skilled in the art. Alternatively, the individual wet wipes can be interfolded such that the leading and trailing end edges of successive wipes in the stacked configuration overlap. In each of these non-interfolded and interfolded configurations, the leading end edge of the following wet wipe is loosened from the stack by the trailing end edge of the leading wet wipe as the leading wet wipe is removed by the user from the dispenser or package. For example, representative wet wipes for use with the invention are described in U.S. Pat. No. 6,585,131 to Huang, et al. and U.S. Pat. No. 6,905,748 to Sosalla, which are incorporated herein in their entirety by reference thereto for all purposes.

The present invention may be better understood with reference to the following examples.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C. or 230° C. Unless otherwise indicated, melt flow rate is measured in accordance with ASTM Test Method D1239 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

The melting temperature may be determined by differential scanning calorimetry (DSC). The differential scanning calorimeter may be a DSC Q100 Differential Scanning Calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools are used. The samples are placed into an aluminum pan and weighed to an accuracy of 0.01 milligram on an analytical balance. A lid is crimped over the material sample onto the pan. Typically, the resin pellets are placed directly in the weighing pan.

The differential scanning calorimeter is calibrated using an indium metal standard and a baseline correction is performed, as described in the operating manual for the differential scanning calorimeter. A material sample is placed into the test chamber of the differential scanning calorimeter for testing, and an empty pan is used as a reference. All testing is run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. All testing is run with a 55-cubic centimeter per minute nitrogen (industrial grade) purge on the test chamber.

The results are evaluated using the UNIVERSAL ANALYSIS 2000 analysis software program, which identified and quantified the glass transition temperature ($T_g$) of inflection, the endothermic and exothermic peaks, and the areas under the peaks on the DSC plots. The glass transition temperature is identified as the region on the plot-line where a distinct change in slope occurred, and the melting temperature is determined using an automatic inflection calculation.

Notched Izod Impact Strength:

Notched Impact strength of injection molded Izod bars were determined by following ASTM D256-10 Method A (Standard Test Methods for Determining the Izod Pendulum Impact Resistance of Plastics). Izod bars were conditioned for 40+ hours at 23° C.±2° C. at 50%±10% relative humidity before testing in the same conditions. The pendulum had a capacity of 2 ft·lbs. Injection molded Izod test specimens had a width 12.70±0.20 mm and thickness of 3.2±0.05 mm.

Unnotched Izod Impact Strength

Unnotched Impact Strength of injection molded Izod bars were determined by following ASTM D 4812-06 (Unnotched Cantilever Beam impact Strength of Plastics). Izod bars were conditioned for 40+ hours at 23° C.±2° C. at 50%±10% relative humidity before being testing in the same conditions. The pendulum had a capacity of 2 ft·lbs or 5 ft·lbs. Injection molded Izod test specimens had a width 12.70±0.20 mm and thickness of 3.2±0.05 mm.

Tensile Properties:

Modulus was determined utilizing a MTS 810 hydraulic tensile frame to pull injection molded Type I dog bones as described in ASTM D638-10. Specimens were conditioned at 23° C.±2° C. and 50%±10% relative humidity for not less than 40 hours. Test conditions were at 23° C.±2° C. and 50%±10% relative humidity. Tensile frame grips were at a nominal gage length of 115 mm. Specimens were pulled at a rate of 50 mm/min (87.7%. min deformation). Five (5) specimens were tested for each composition. A computer program called TestWorks 4 was used to collect data during testing and to generate a stress versus strain curve from which the average modulus of five specimens was determined.

Peak stress, break stress, elongation at break, and energy per volume at break were determined using a MTS Synergie 200 tensile frame to pull injection molded Type V dog bones at described in ASTM D638-10. Specimens were conditioned at 23° C.±2° C. at 50%±10% relative humidity for not less than 40 hours. Test conditions were at 23° C.±2° C. at 20%±10% relative humidity. Tensile frame grips were at a nominal gage length of 25.4 mm. Specimens were pulled at a rate of 8.4 mm/min (87.7%/min deformation). Five (5) specimens were tested for each composition. A computer program called TestWorks 4 was used to collect data during testing and to generate a stress versus strain curve from which the average peak stress, break stress, elongation at break, and energy per volume at break were determined.

High Speed Puncture Property

High Speed Puncture Property of Average Total Energy was determined by following guidelines of ASTM D3763-10 *Standard Test Method for High Speed Puncture Properties of Plastics Using Load and Displacement Sensors*. Specimens were prepared by forming injection molded 63.5±0.5 mm diameter disk with a thickness of 1.09±0.2 mm. Injection molding was carried out by flood feeding pellets into a Spritzgiessautomaten BOY 22D injection molding device at a barrel temperature of 225° C. to 195° C., mold temperature of approximately 27° C., and cycle time of approximately 40 seconds. The ASTM D3763 test speed was 3.3 meters/second, the test conditions were 23° C.±2° C./50%±10% RH, utilizing Intron Dynatup 8250 with Impulse Data Acquisition System v 2.2.1, Tup Diameter of 12.7 mm, with based and top support clamp assembly having 40 mm diameter. Reported for Examples 1, 4, 5, 7, 11, and 16 are the Average Total Energy (Joules).

Shrinkage from Mold Dimensions

Shrinkage from injection mold cavity dimensions was determined by following ASTM D955-08 *Standard Test Method of Measuring Shrinkage from Mold Dimensions of Thermoplastics*. Injection mold cavity had a length ($L_m$) dimension of 126.78 mm and width ($W_m$) dimension of 12.61 mm, which conforms to ASTM D955-08 Type A specimen. The average length ($L_s$) and width ($W_s$) of the 5 test specimens were measured after 24±1 hours, 48±1 hours, or 96±1 hours after specimens had been removed from the mold. Shrinkage in the length direction ($S_l$) was calculated by $S_l=(L_m-L_s)\times100/L_m$. Shrinkage of the width direction ($S_w$) was calculated by $S_w=(W_m-W_s)\times100/W_m$.

Moisture Content

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§X2.1.2) may be 130° C., the sample size (§X2.1.1) may be 2 to 4 grams, and the vial purge time (§X2.1.4) may be 30 seconds. Further, the ending criteria (§X2.1.3) may be defined as a "prediction" mode, which means that the test is ended when the built-in programmed criteria (which mathematically calculates the end point moisture content) is satisfied.

EXAMPLE 1

Polylactic acid (PLA 6201D having a melt flow rate of 10 g/10 min at 190° C., Natureworks®) was formed into an injected molded part as a control. The shrinkage from the mold length dimension after 24 hours and 48 hours were 0.2% and 0.2%, respectively. The shrinkage from the mold width dimension after 24 and 48 hours were −0.5% and 0.1%.

EXAMPLE 2

The ability to form injection molded parts from a blend of 88.7 wt. % polylactic acid (PLA 6201D having a melt flow rate of 10 g/10 min at 190° C., Natureworks®) 9.9 wt. % of a toughening additive and 1.4% polyepoxide modifier was demonstrated. The toughening additive was VISTAMAXX™ 2120 (ExxonMobil), which is a polyolefin copolymer/elastomer with a melt flow rate of 29 g/10 min (190° C., 2160 g) and a density of 0.866 g/cm³. The polyepoxide modifier was poly(ethylene-co-methyl acrylate-co-glycidyl methacrylate) (LOTADER® AX8950, Arkema) having a melt flow rate of 70-100 g/10 min (190° C./2160 g), a glycidyl methacrylate content of 7 to 11 wt. %, methyl acrylate content of 13 to 17 wt. %, and ethylene content of 72 to 80 wt. %. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm").

The pellets were then flood fed into an injection molded device (Spritzgiessautomaten BOY 22D) and molded into a part at a barrel temperature of approximately 210±25° C., mold temperature of approximately 20±13° C., and cycle time of approximately 45±25 seconds. The shrinkage from the mold length dimension after 24 hours and 48 hours was 0.4% and 0.4%, respectively. The shrinkage from the mold width dimension after 24 and 48 hours was 0.0% and 0.2%.

EXAMPLE 3

Parts were injection molded as described in Example 2, except that the blend contained 85.3 wt. % polylactic acid (PLA 6201D, Natureworks®), 9.5 wt. % of toughening additive VISTAMAXX™ 2120 (ExxonMobil), 1.4 wt. % polyepoxide modifier (LOTADER® AX8950, Arkema), and 3.8 wt. % interphase modifier (PLURIOL® WI 285 from BASF). The PLURIOL® WI-285 was added via injector pump into barrel zone #2. The shrinkage from the mold length and width dimensions after 96 hours was −0.4% and 0.3%, respectively.

EXAMPLE 4

Parts were injection molded as described in Example 3, except that LOTADER® AX8900 (Arkema) was employed as the polyepoxide modifier.

EXAMPLE 5

Parts were injection molded as described in Example 2, except that the blend contained 84.5 wt. % polylactic acid (PLA 6201 D, Natureworks®), 9.4 wt. % of toughening additive VISTAMAXX™ 2120 (ExxonMobil), 1.4 wt. % polyepoxide modifier (LOTADER® AX8900, Arkema), and 4.7 wt. % interphase modifier HALLGREEN® IM-8830 from Hallstar. The HALLGREEN® IM-8830 was added via injector pump into barrel zone #2.

EXAMPLE 6

Parts were injection molded as described in Example 4, except that the toughening additive was EXCEED™ 3512CB resin (ExxonMobil).

EXAMPLE 7

Parts were injection molded as described in Example 4, except that the toughening additive was ESCORENE™ UL EVA 7720 (ExxonMobil).

EXAMPLE 8

Parts were injection molded as described in Example 2, except that the blend contained 88.7 wt. % polylactic acid (PLA 6201D, Natureworks®), 9.9 wt. % of toughening additive polypropylene, PP 3155 (ExxonMobil), and 1.4 wt. % polyepoxide modifier (LOTADER® AX8950, Arkema).

EXAMPLE 9

Parts were injection molded as described in Example 8, except that the blend contained 87.4 wt. % polylactic acid (PLA 6201D, Natureworks®), 9.7 wt. % of toughening additive VISTAMAXX™ 2120 (ExxonMobil) and about 2.9 wt. % of maleic anhydride grafted polypropylene, Fusabond 353D (ExxonMobil).

EXAMPLE 10

Parts were injection molded as described in Example 4, except that the toughening additive was INFUSE™ 9507 olefin block copolymer resin (Dow Chemical Company).

EXAMPLE 11

Parts were injection molded as described in Example 4, except that the toughening additive was VECTOR* 4113A styrenic block copolymer resin (Dexco Polymers LP).

EXAMPLE 12

Parts were injection molded as described in Example 11, except that the interphase modifier was HALLGREEN® IM-8830 from Hallstar.

EXAMPLE 13

Parts were injection molded as described in Example 7, except that the interphase modifier was HALLGREEN® IM-8830 from Hallstar.

EXAMPLE 14

Parts were injection molded as described in Example 2, except that the blend contained 80.6 wt. % polylactic acid (PLA 6201D, Natureworks®), 14.2 wt. % of toughening additive ESCORENE™ UL EVA 7720 (ExxonMobil), 1.4 wt. % polyepoxide modifier (LOTADER® AX8900, Arkema), and 3.8 wt. % interphase modifier (PLURIOL® WI 285 from BASF). The PLURIOL® WI-285 was added via injector pump into barrel zone #2.

EXAMPLE 15

Parts were injection molded as described in Example 14, except that the blend contained 90.1 wt. % polylactic acid (PLA 6201D, Natureworks®), 4.7 wt. % of toughening additive ESCORENE™ UL EVA 7720 (ExxonMobil), 1.4 wt. % polyepoxide modifier (LOTADER® AX8900, Arkema), and 3.8 wt. % interphase modifier (PLURIOL® WI 285 from BASF). The PLURIOL® WI-285 was added via injector pump into barrel zone #2.

EXAMPLE 16

Parts were injection molded as described in Example 2, except that LOTADER® AX8900 (Arkema) was employed as the polyepoxide modifier.

The injection molded parts of Examples 1-16 were then tested for impact strength, high speed puncture properties, and tensile properties in the manner described above. The results are set forth below.

| Ex | Desc | Notched Izod Impact Strength (J/cm) | Unnotched Impact Strength (J/cm) | High Speed Puncture Property (Joules) | Avg. Modulus (MPa) | Avg. Peak Stress (MPa) | Avg. Break Stress (MPa) | Avg. Elongation at Break (%) | Energy Per Volume At Break (J/cm$^3$) |
|---|---|---|---|---|---|---|---|---|---|
| 1 | PLA | 0.26 | 1.79 | 0.30 | 3712 | 67.6 | 57.0 | 11.8 | 5.7 |
| 2 | PLA VIM LOT | 0.45 | 2.03 | — | 2933 | 55.0 | 27.9 | 19.5 | 6.3 |
| 3 | PLA VIM LOT WI | 0.56 | 1.98 | — | 2788 | 35.8 | 33.1 | 165.4 | 49.2 |
| 4 | PLA VFM LOT WI | 0.71 | — | 1.78 | 2511 | 36.5 | 35.5 | 200.3 | 57.8 |
| 5 | PLA VTM LOT IM | 1.88 | — | 2.91 | 2373 | 31.8 | 30.6 | 196.8 | 50.0 |
| 6 | PLA Exceed™ LOT WI | 0.61 | 5.84 | — | 2318 | 41.2 | 41.2 | 236.6 | 74.1 |
| 7 | PLA EVA LOT WI | 1.27 | — | 3.32 | 2247 | 382 | 37.9 | 236.8 | 68.4 |
| 8 | PLA PP LOT | 0.31 | — | — | 3270 | 62.0 | 49.7 | 8.3 | 3.4 |
| 9 | PLA VTM FUS | — | 2.59 | — | 2922 | 52.3 | 41.8 | 8.0 | 2.8 |
| 10 | PLA INFUSE™ LOT WI | 0.70 | — | — | 2604 | 37.5 | 37.3 | 209.5 | 61.2 |
| 11 | PLA VECTOR LOT WI | 0.70 | — | 4.16 | 2584 | 36.0 | 35.7 | 205.1 | 58.1 |
| 12 | PLA VECTOR LOT IM | 0.94 | — | — | 2600 | 29.7 | 24.1 | 116.8 | 27.1 |
| 13 | PLA EVA LOT IM | 0.95 | — | — | 2554 | 35.8 | 35.8 | 210.0 | 58.8 |
| 14 | PLA 14.2% EVA LOT WI | 1.76 | — | — | 2148 | 30.7 | 28.4 | 174.4 | 43.6 |
| 15 | PLA 4.7% EVA LOT WI | 0.33 | — | — | 2516 | 44.4 | 43.7 | 231.1 | 74.8 |
| 16 | PLA VTM LOT | — | — | 1.13 | 2427 | 55.2 | 30.9 | 62.0 | 19.1 |

Figure 2:
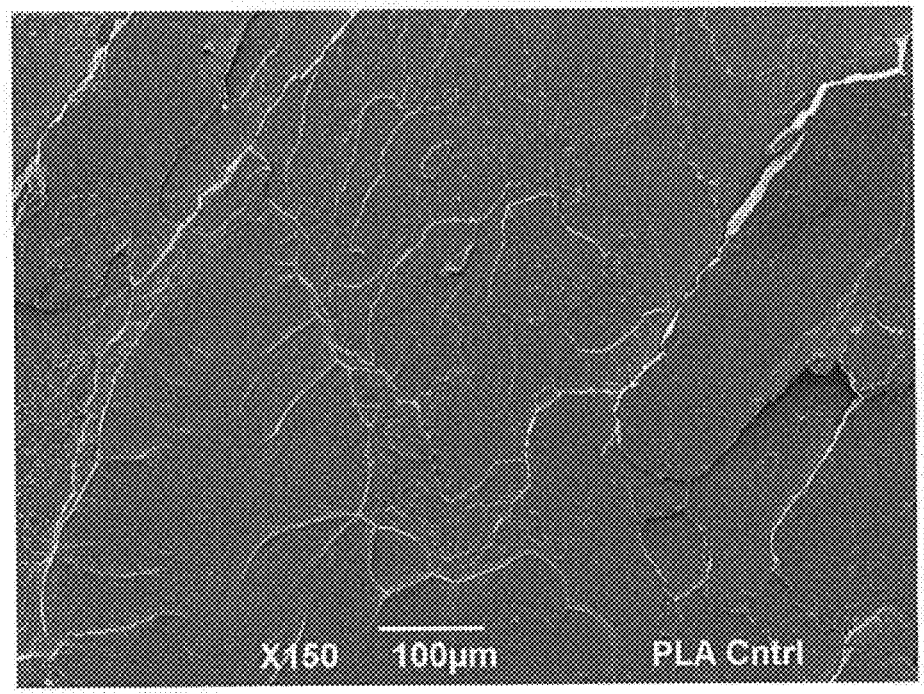
FIG. 2 is an SEM photomicrograph of a sample of Example 1 before testing.
Figure 3:
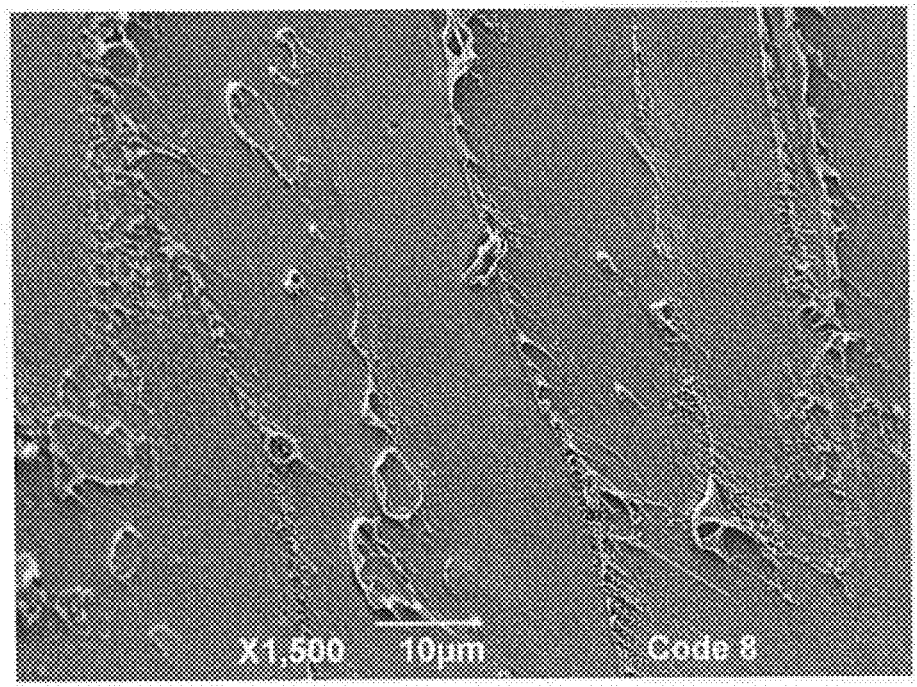
FIG. 3 is an SEM photomicrograph of a sample of Example 1 after impact testing.
Figure 4:
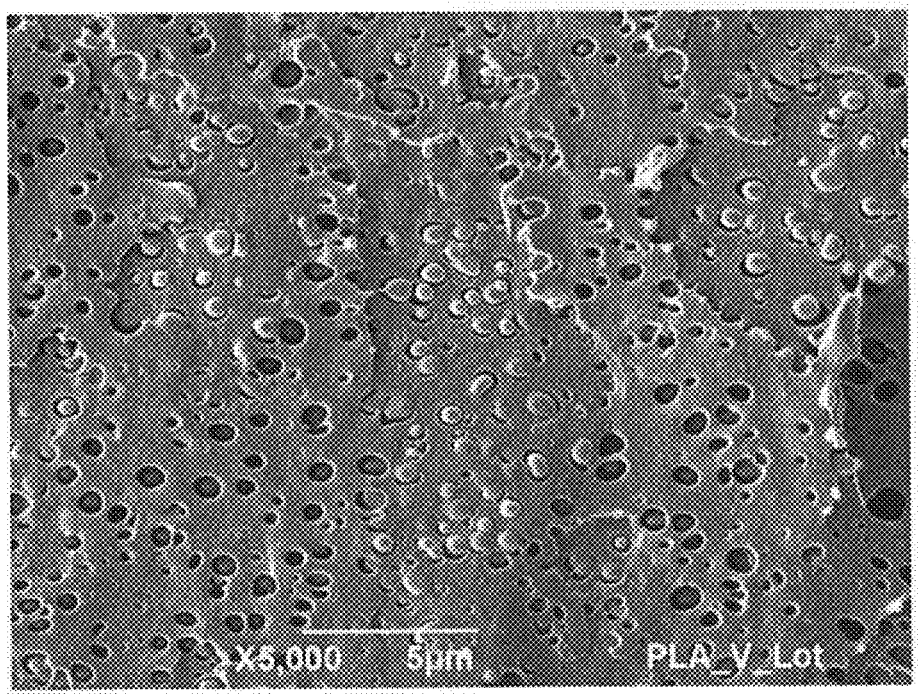
FIG. 4 is an SEM photomicrograph of a sample of Example 3 before testing.
Figure 5:
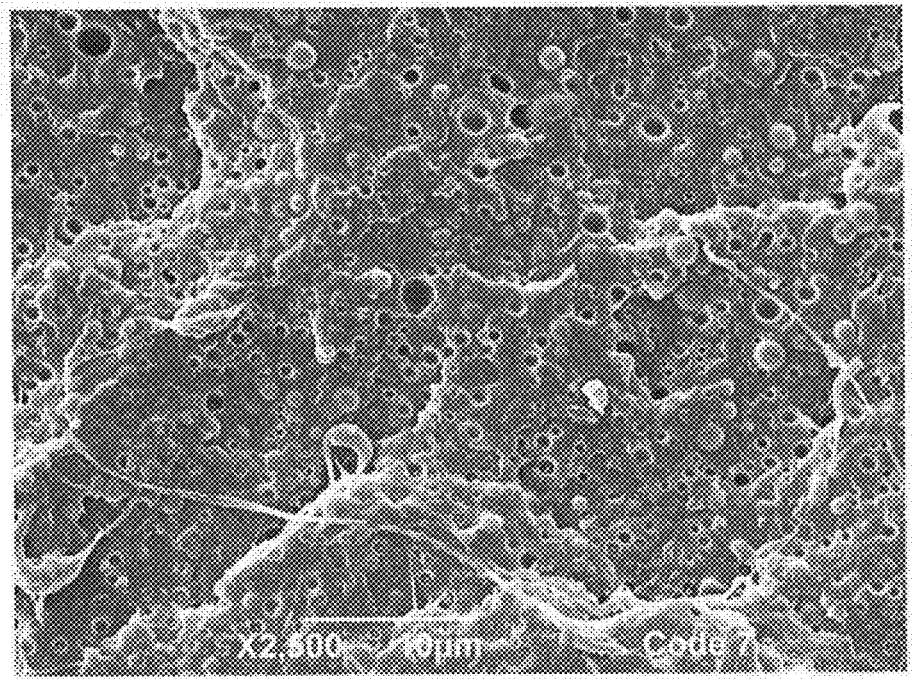
FIG. 5 is an SEM photomicrograph of a sample of Example 3 after impact testing.
Figure 6:
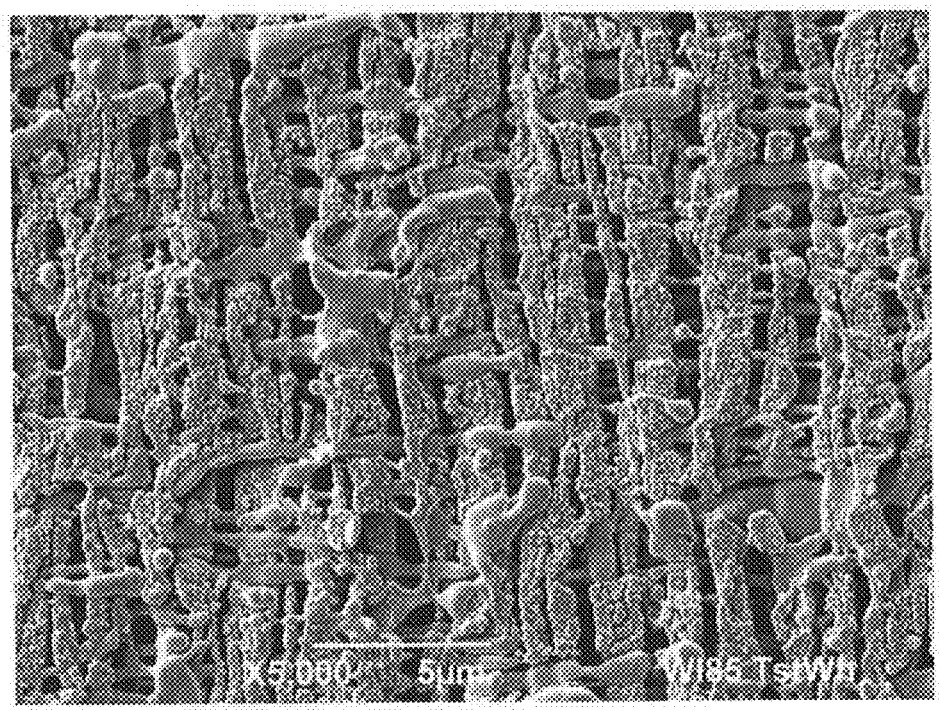
FIG. 6 is an SEM photomicrograph of a sample of Example 3 after tensile testing and oxygen plasma etching.

As indicated above, the samples containing an interphase modifier (Samples 3-7 and 10-15) generally exhibited a much higher impact resistance than Sample 1 (containing only polylactic acid), Samples 2, 8-9, and 16 (containing only polylactic acid, toughening additive, and polyepoxide modifier). SEM photomicrographs were also taken of Example 1 (containing only polylactic acid) and 3 (containing interphase modifier) before and after testing. The results are shown in FIGS. 2-6. FIGS. 2-3, for example, show samples formed in Example 1 before and after impact testing. FIG. 4 shows a sample formed in Example 3 prior to impact/tensile testing. As shown, the PLA matrix of Example 3 has underwent debonding, which resulted in the formation of a plurality of voids adjacent to discrete domains of the Vistamaxx™ polymer. FIGS. 5-6 likewise show the sample of Example 3 after impact and tensile testing, respectively (FIG. 6 was obtained after oxygen plasma etching). As shown in FIG. 6, for instance, nearly parallel linear openings are formed that are oriented perpendicular to the stress application direction and extending across the width of the material samples exposed to external stress. The openings have a plurality of voided features, as well as a plurality of elongated ligaments that together help dissipate stress.

EXAMPLE 17

Polyethylene terephthalate (Crystar 4434 from Du Pont) was extruded and then formed into an injected molded part as a control.

EXAMPLE 18

The ability to form injection molded parts a blend of 88.7 wt. % polyethylene terephthalate (Crystar 4434 from Du Pont) 9.9 wt. % of a toughening additive and 1.4% polyepoxide modifier was demonstrated. The toughening additive was VISTAMAXX™ 2120 (ExxonMobil), which is a polyolefin copolymer/elastomer with a melt flow rate of 29 g/10 min (190° C., 2160 g) and a density of 0.866 g/cm$^3$. The polyepoxide modifier was poly(ethylene-co-methyl acrylate-co-glycidyl methacrylate) (LOTADER® AX8900, Arkema) having a melt flow rate of 6 g/10 min (190° C./2160 g), a glycidyl methacrylate content of 8 wt. %, methyl acrylate content of 24 wt. %, and ethylene content of 68 wt. %. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm").

The pellets were then flood fed into an injection molded device (Spritzgiessautomaten BOY 22D) and molded into a part at a barrel temperature of approximately 285±45° C., mold temperature of approximately 27±10° C., and cycle time of approximately 35±10 seconds.

EXAMPLE 19

Parts were injection molded as described in Example 18, except that the blend contained 85.3 wt. % polyethylene terephthalate (Crystar 4434 from Du Pont), 9.5 wt. % of toughening additive VISTAMAXX™ 2120 (ExxonMobil), 1.4 wt. % polyepoxide modifier (LOTADER® AX8900, Arkema), and 3.8 wt. % internal interphase modifier (PLURIOL® WI 285 from BASF). The PLURIOL® WI-285 was added via injector pump into barrel zone #2.

EXAMPLE 20

Parts were injection molded as described in Example 19, except that the toughening additive was ESCORENE™ UL EVA 7720 (ExxonMobil).

The injection molded parts of Examples 17-20 were then tested for impact strength and tensile properties in the manner described above. The results are set forth below.

| Example | Description | Avg. Modulus (MPa) | Avg. Peak Stress (MPa) | Avg. Beak Stress (MPa) | Avg. Elongation at Break % | Energy Per Volume At Break (J/cm³) |
|---|---|---|---|---|---|---|
| 17 | PET | 2125 | 57.9 | 32.6 | 116.0 | 34.9 |
| 18 | PET VTM LOT | 1614 | 49.5 | 47.6 | 300.5 | 101.0 |
| 19 | PET VTM LOT WI | 1570 | 36.9 | 25.8 | 92.0 | 23.6 |
| 20 | PET EVA LOT WI | 1651 | 38.7 | 22.2 | 27.7 | 6.6 |

EXAMPLE 21

Parts were injection molded as described in Example 2, except that the blend contained 96.2 wt. % polylactic acid (PLA 6201D, Natureworks®) and 3.8 wt. % PLURIOL® WI 285 from BASF. The PLURIOL® WI-285 was added via injector pump into barrel zone #2.

EXAMPLE 22

Parts were injection molded as described in Example 2, except that the blend contained 95.2 wt. % polylactic acid (PLA 6201 D, Natureworks®) and 4.7 wt. % HALLGREEN® IM-8830 from Hallstar. The HALLGREEN® IM-8830 was added via injector pump into barrel zone #2.

EXAMPLE 23

Parts were injection molded as described in Example 2, except that the blend contained 96.2 wt. % polylactic acid (PLA 6201D, Natureworks®) and 3.8 wt. % Carbowax™ PEG 3350 polyethylene glycol from Dow Chemical.

Glass transition temperature was determined for Examples 1, 21-23, 16, 4, and 5 as described above. The results are set forth below.

| EXAMPLE | Description | $T_g$ (E") [° C.] | $T_g$ (tanδ) [° C.] | $T_g$ tanδ ratio |
|---|---|---|---|---|
| 1 | PLA | 70.6 | 78.5 | — |
| 21 | PLA WI | 63.8 | 72 | 0.92 |
| 22 | PLA IM | 61.9 | 70.8 | 0.90 |
| 23 | PLA PEG | 63.2 | 73 | 0.93 |
| 16 | PLA VTM LOT | 69.3 | 77.4 | 0.99 |
| 4 | PLA VTM LOT WI | 64.1 | 71.8 | 0.91 |
| 5 | PLA VTM LOT IM | 65.4 | 73.2 | 0.93 |

The above data demonstrates that the ratio of the glass transition temperature of the thermoplastic composition to the glass transition temperature of the renewable polyester is between 0.7 to about 1.3.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A melt blended, thermoplastic composition comprising:
a rigid polyester having a glass transition temperature of from 30° C. to 100° C., wherein the polyester constitutes about 70 wt. % or more of the thermoplastic composition;
from about 1 wt. % to about 30 wt. % of at least one polymeric toughening additive based on the weight of the polyester;
from about 0.1 wt. % to about 20 wt. % of at least one interphase modifier based on the weight of the polyester, wherein the interphase modifier comprises a silicone, a silicone-polyether copolymer, an alkylene glycol, an alkane diol, an amine oxide, a fatty acid ester, or a combination thereof; and
wherein the thermoplastic composition has a morphology in which a plurality of discrete primary domains are dispersed within a continuous phase, the domains containing the polymeric toughening additive and the continuous phase containing the polyester,
wherein the ratio of the glass transition temperature of the thermoplastic composition to the glass transition temperature of the polyester is from about 0.7 to about 1.3, and
wherein the thermoplastic composition has a tensile modulus of from about 500 to about 3800 MPa.

2. The thermoplastic composition of claim 1, wherein polyester and the thermoplastic composition have a glass transition temperature of from about 50° C. to about 75° C.

3. The thermoplastic composition of claim 1, wherein the ratio of the solubility parameter for the polyester to the solubility parameter of the polymeric toughening additive is from about 0.5 to about 1.5.

4. The thermoplastic composition of claim 3, wherein the polymeric toughening additive has a solubility parameter of from about 15 to about 30 MJoules$^{1/2}$/m$^{3/2}$.

5. The thermoplastic composition of claim 1, wherein ratio of the melt flow rate for the polyester to the melt flow rate of the polymeric toughening additive is from about 0.2 to about 8.

6. The thermoplastic composition of claim 1, wherein the ratio of the Young's modulus elasticity of the polyester to the Young's modulus of elasticity of the polymeric toughening additive is from about 2 to about 500.

7. The thermoplastic composition of claim 1, wherein the polyolefin is a propylene homopolymer, propylene/α-olefin copolymer, ethylene/α-olefin copolymer, or a combination thereof.

8. The thermoplastic composition of claim 1, wherein the interphase modifier has a kinematic viscosity of from about 0.7 to about 200 centistokes, determined at a temperature of 40° C.

9. The thermoplastic composition of claim 1, wherein the interphase modifier is hydrophobic.

10. The thermoplastic composition of claim 1, wherein the interphase modifier is an alkylene glycol, an alkane diol, a fatty acid ester, or a combination thereof.

11. The thermoplastic composition of claim 1, wherein the discrete domains have a length of from about 0.05 micrometers to about 30 micrometers.

12. The thermoplastic composition of claim 1, wherein the compatibilizer comprises a polyepoxide modifier.

13. The thermoplastic composition of claim 12, wherein the polyepoxide modifier includes an epoxy-functional (meth)acrylic monomeric component.

14. The thermoplastic composition of claim 13, wherein the polyepoxide modifier is poly(ethylene-co-methacrylate-co-glycidyl methacrylate).

15. The thermoplastic composition of claim 1, wherein the composition exhibits an Izod impact strength of about 0.3 Joules per centimeter or more, measured at 23° C. according to ASTM D256-10 (Method A), and a tensile elongation at break of about 10% or more, measured at 23° C. according to ASTM D638-10.

16. The thermoplastic composition of claim 1, wherein the composition exhibits an Izod notched impact strength of from about 0.8 Joules per centimeter to about 2.5 Joules per centimeter, measured at 23° C. according to ASTM D256-10 (Method A).

17. The thermoplastic composition of claim 1, wherein the composition exhibits a tensile elongation at break of from about 100% to about 300%, measured at 23° C. according to ASTM D638-10.

18. The thermoplastic composition of claim 1, wherein the rigid polyester comprises polylactic acid.

19. The thermoplastic composition of claim 1, wherein the rigid polyester comprises polyethylene terephthalate.

20. The thermoplastic composition of claim 1, wherein the rigid polyester constitutes from about 80 wt. % to about 99 wt. % of the thermoplastic composition.

21. The thermoplastic composition of claim 1, wherein the polymeric toughening additive includes a polyolefin.

22. The thermoplastic composition of claim 1, wherein the composition further includes a compatibilizer.

23. The thermoplastic composition of claim 22, wherein the compatibilizer is present in an amount of from about 0.5 wt. % to about 20 wt. %, based on the weight of the composition.

* * * * *